(12) United States Patent
Brown et al.

(10) Patent No.: US 9,927,273 B2
(45) Date of Patent: Mar. 27, 2018

(54) OPTICAL FLOW MEASURING DEVICE AND METHOD OF OPERATION

(71) Applicant: Fluke Electronics Corporation, Everett, WA (US)

(72) Inventors: Malcolm Charles Brown, Wirral (GB); Keith Norman McMann, Liverpool (GB)

(73) Assignee: Fluke Electronics Corporation, Everett, WA (US)

( * ) Notice: Subject to any disclaimer, the term of this patent is extended or adjusted under 35 U.S.C. 154(b) by 586 days.

(21) Appl. No.: 14/549,860

(22) Filed: Nov. 21, 2014

(65) Prior Publication Data

US 2015/0149099 A1 May 28, 2015

(30) Foreign Application Priority Data

Nov. 22, 2013 (GB) .................................. 1320638.8

(51) Int. Cl.
*G01F 1/708* (2006.01)
*G01F 1/00* (2006.01)
*G01F 23/292* (2006.01)

(52) U.S. Cl.
CPC ............ *G01F 1/7086* (2013.01); *G01F 1/007* (2013.01); *G01F 23/292* (2013.01)

(58) Field of Classification Search
None
See application file for complete search history.

(56) References Cited

U.S. PATENT DOCUMENTS

| 4,938,072 A | 7/1990 | Brown | |
|---|---|---|---|
| 5,116,119 A | 5/1992 | Brayer | |
| 5,487,309 A | 1/1996 | Brown | |
| 5,837,905 A * | 11/1998 | Strauss | A61M 1/3663 73/861.63 |
| 2004/0089067 A1* | 5/2004 | Frank | G01F 23/2921 73/293 |

FOREIGN PATENT DOCUMENTS

EP 1382946 A1 1/2004

OTHER PUBLICATIONS

European Search Report dated Mar. 24, 2015, issued in corresponding EP Application No. 14194299.5. filed Nov. 21, 2014, 7 pages.
Great Britain Search Report dated May 23, 2014, issued in corresponding GB Application No. 1320638.8, filed Nov. 22, 2013, 1 page.

* cited by examiner

*Primary Examiner* — Whitney T Moore
(74) *Attorney, Agent, or Firm* — Seed Intellectual Property Law Group LLP (57) ABSTRACT

A flow measuring device, comprising a container for receiving a flow of liquid, a plurality of optical sensors associated with the container, each of the plurality of optical sensors producing an output signal dependent upon the presence of liquid reaching a level in the container associated with each optical sensor, means for modifying the output signal in accordance with at least one predetermined temperature compensation factor, and means for calculating a flow rate from the time at which the liquid traverses between two levels in the container.

17 Claims, 7 Drawing Sheets

OPTICAL FLOW MEASURING DEVICE AND METHOD OF OPERATION

BACKGROUND

The present disclosure relates to a flow measuring device and a method of operating the device. In particular, this disclosure relates to an optical flow measuring device for checking medical infusion devices and which compensates for the effects of temperature on the optical sensors.

It is essential when treating patients that they receive the correct dosage of drugs or medication that is administered using a medical infusion device. Medical infusion devices have been known for many years, and are often utilized where it would otherwise be impractical, unreliable, or too expensive to administer the medication manually by medical practitioners. For example, medical infusion devices can administer medication at flow rates as low as 0.1 ml per hour. They can supply doses every minute or so or repeated boluses as requested by the patient up to maximum number per hour (e.g., in patient-controlled analgesia), or supply fluids whose volumes vary by the time of day. Small-volume pumps include motorized syringes and small electronic diaphragm pumps. Higher flow rates can be achieved using peristaltic pumps, gravity-fed infusion lines, and gravity-fed flow controllers that are also known in the prior art.

While infusion devices differ in their mode of operation and range of delivery, what is common to all types of medical infusion devices is the need to accurately check that the device is delivering medication at the required dose. While it would be possible to have a testing device for each type of medical infusion device, it is desirable to have a common testing device for the many types of medical infusion devices that are available in the marketplace.

U.S. Pat. No. 4,938,092 describes a known flow measuring device which can be used to test a variety of medical infusion devices. This flow measuring device has an optical measurement sensor that detects when a liquid in a vertical tube moves between two levels. Since the volume defined between the two levels is known, simply dividing the known volume by the time measured for the liquid to move between the two levels derives a flow rate. This technique has been further developed in U.S. Pat. No. 5,487,309 to utilize multiple pairs of optical sensors to improve the measurement discrimination and reduce error.

This measurement technique, using optical measurement sensors, is susceptible to changes in temperature. Put simply, the voltage that is outputted from the sensor pair is temperature-dependent. In order to compensate for these temperature-dependent changes, it is often necessary to measure, or have knowledge of, the temperature, which necessitates a further transducer and other compensation circuitry to offset temperature-dependent effects. These additional components therefore increase the overall cost and complexity of the flow measuring device, and since these devices are often realized using a microprocessor, there is therefore a resultant computational cost as well.

SUMMARY

It is an object of the present disclosure to provide a flow measuring device and a method of operating the device that overcomes, or at least reduces, the drawbacks associated with known optical medical infusion testing devices. The flow measuring device and a method of operating the device enable a reduction in the incidence of errors due to temperature-induced changes in the performance of the optical sensors. This is achieved without any measurement, or knowledge, of the actual temperature of the sensor pair.

As disclosed herein, there is provided a flow measuring device, comprising:
a container for receiving a flow of liquid;
a plurality of optical sensors associated with the container, each of the plurality of optical sensors producing an output signal dependent upon the presence of liquid reaching a level in the container associated with each optical sensor;
means for modifying the sensed output signal in accordance with at least one predetermined temperature compensation factor; and
means for calculating a flow rate from the time at which the liquid traverses between two levels in the container.

An advantage of using a flow measuring device according to the present disclosure for checking medical infusion devices is that a reduction in the incidence of errors due to temperature-induced changes in the performance of the optical sensors is achieved. This is achieved without any measurement, or knowledge, of the actual temperature of the optical sensor pair.

Preferably, the flow measuring device further comprises means for displaying the calculated flow rate.

Further preferably, the at least one predetermined temperature compensation factor compensates for the effects of temperature on the plurality of optical sensors.

In use, the at least one predetermined temperature compensation factor may compensate for the effects of temperature on the plurality of optical sensors by minimizing the prospect of the sensed output signal exceeding a predetermined threshold voltage which produces a potentially false determination that liquid is present in the container.

Preferably, the at least one predetermined temperature compensation factor compensates for the effects of temperature on the plurality of optical sensors by minimizing the prospect of the sensed output signal falling below the predetermined threshold voltage which produces a potentially false determination that liquid is not present in the container.

Further preferably, the plurality of optical sensors are each configured as a light-emitting diode and corresponding photodetector positioned on opposing sides of the container.

In use, the plurality of optical sensors may be positioned to define at least two levels in the container having at least one known volume therebetween.

Preferably, the means for modifying, the means for calculating, and the means for displaying are implemented in a microprocessor or digital signal processor.

Further preferably, the microprocessor or digital signal processor also includes additional programmable functionality, which is selected from the group comprising, but not limited to, any one of the following: the capability to determine and display the delivered liquid volume, flow rate, and/or back pressure.

Also according to the present disclosure, there is provided a method for controlling a flow measuring device, the flow measuring device comprising a container for receiving a flow of liquid and a plurality of optical sensors associated with the container and positioned to define at least two levels in the container. The method comprises the steps of:
sensing at least one output signal from each of the plurality of optical sensors ($V_{Out}$) that is dependent upon the presence of liquid reaching a level in the container associated with each optical sensor;
modifying the sensed output signal in accordance with at least one predetermined temperature compensation factor; and calculating a flow rate from the time at which the liquid traverses between two levels in the container.

In use, the step of modifying the sensed output signal in accordance with at least one predetermined temperature compensation factor may further comprise the steps of:

priming the container with liquid and modifying the output signal from each of the plurality of optical sensors to a first voltage output level ($V_{WetSet}$);

removing liquid from the container and sensing a second voltage output level ($V_{DrySet}$) from each of the plurality of optical sensors; and calculating a threshold voltage ($V_T$) from the first voltage output level ($V_{WetSet}$) and the second voltage output level ($V_{DrySet}$).

Preferably, the step of calculating a threshold voltage ($V_T$) from the first voltage output level ($V_{WetSet}$) and the second voltage output level ($V_{DrySet}$) is obtained from $V_T = V_{WetSet} + K(V_{DrySet} - V_{WetSet})$, where K=0.5, or another value.

Further preferably, the method comprises the steps of:

priming the container with liquid and sensing a third voltage output level ($V_{wet}$) from each of the plurality of optical sensors;

removing liquid from the container and sensing a fourth voltage output level ($V_{Dry}$) from each of the plurality of optical sensors;

repeating the priming and removing steps over a range of temperatures; and calculating a compensation factor $\alpha$ that is a ratio of the change of $V_{Dry}$ to the change of $V_{Wet}$ with temperature.

In use, the method further comprises the step of:

storing the first voltage output level ($V_{WetSet}$), the second voltage output level ($V_{DrySet}$), the threshold voltage ($V_T$) and the compensation factor $\alpha$ in a non-volatile memory.

Preferably, the method further comprises the steps of:

calculating a fifth voltage output level ($V_{Wetshift}$) from $V_{Wetshift} = V_{Wet} - V_{WetSet}$; and compensating the fifth voltage output level ($V_{Wetshift}$) by the compensation factor $\alpha$ stored in the non-volatile memory.

Further preferably, the method further comprises the step of:

calculating a temperature-compensated signal ($V_{OutCorrected}$) from $V_{OutCorrected} = V_{Out} - V_{Wetshift}$.

In use, the method further comprises the step of:

displaying the calculated flow rate.

Further, according to the present disclosure, there is provided a non-transitory computer program product having computer-executable instructions stored thereon for controlling a flow measuring device, the flow measuring device comprising a container for receiving a flow of liquid, and a plurality of optical sensors associated with the container and positioned to define at least two levels in the container, the computer program product comprising:

computer-executable instructions for sensing at least one output signal from each of the plurality of optical sensors ($V_{Out}$) that is dependent upon the presence of liquid reaching a level in the container associated with each optical sensor;

computer-executable instructions for modifying the sensed output signal in accordance with at least one predetermined temperature compensation factor; and computer-executable instructions for calculating a flow rate from the time at which the liquid traverses between two levels in the container.

It is believed that a flow measuring device and a method of operating the device in accordance with the present disclosure at least addresses the problems outlined above. Those skilled in the art will recognize variations of the present disclosure are possible and it is intended that the present disclosure may be used other than as specifically described herein.

DESCRIPTION OF THE DRAWINGS

Specific non-limiting embodiments of the disclosure will now be described by way of example only and with reference to the accompanying drawings, in which.

DETAILED DESCRIPTION

Figure 1:
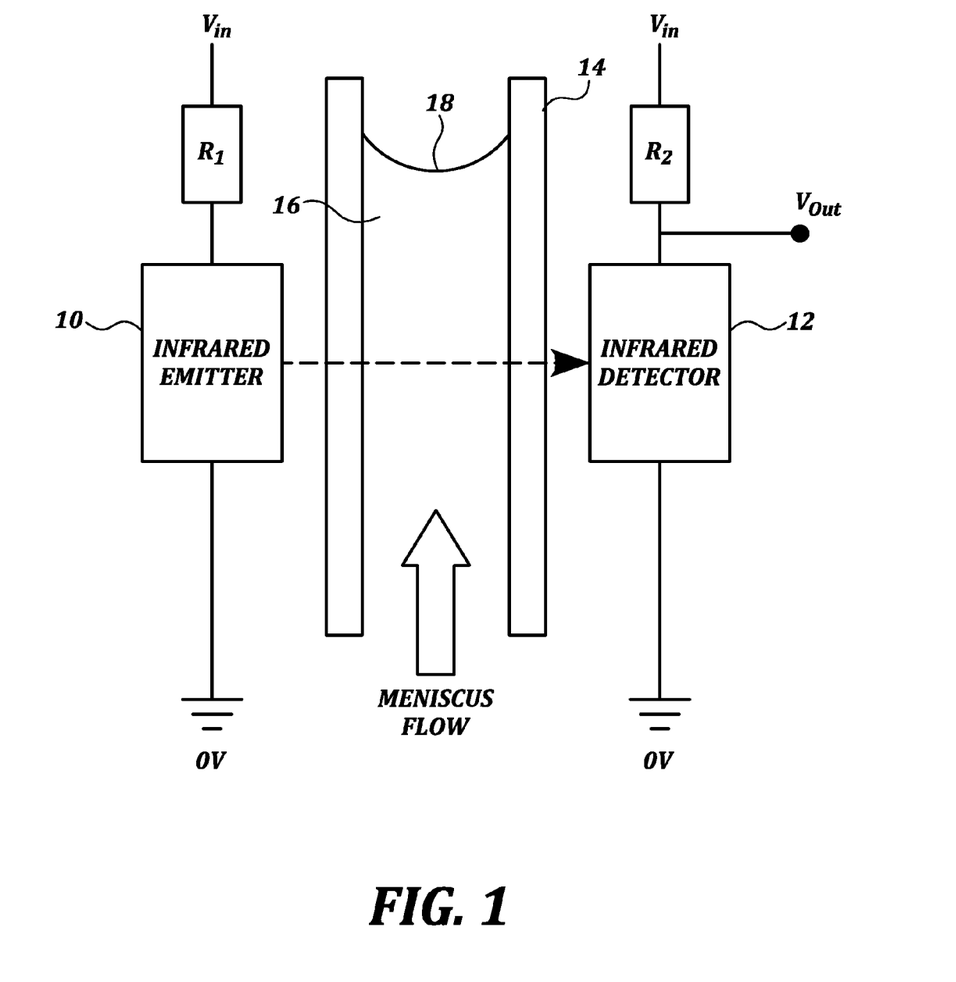
FIG. 1 illustrates an optical level sensor pair that is used in the flow measuring device according to the present disclosure.

Referring now to the drawings, a level sensor pair which is used in a flow measuring device for checking medical infusion devices is shown in FIG. 1. FIG. 1 shows that a light-emitting diode 10 (the abbreviation "LED" will be used throughout in place of "light emitting diode") and a photodetector 12 are placed on opposing sides of a container or vessel 14. The LED 10 and photodetector 12 are configured as a level sensor pair.

At least one further level sensor pair is positioned on the generally vertical vessel 14 to detect when a liquid 16 in the vessel 14 moves between the two distinct levels defined by the sensor pairs. When checking a medical infusion device, the test liquid 16 that is generally used is water because of its availability and inherent chemical and optical properties. Since the volume defined between the two levels is known, simply dividing the known volume by the time measured for the liquid to move between the two levels derives a flow rate.

FIG. 1 illustrates that when there is no liquid 16 between the LED 10 and photodetector 12, the sensor pair produces a known voltage $V_{out}$ that is significantly different from when a liquid is present. The output of the sensor pair is monitored by a processing unit (not shown), and as a test fluid meniscus 18 travels up the vessel 14, the rate of flow and volume can be determined based on the pre-calibrated volume between each sensor pair. The skilled person will appreciate that the processing unit will also include a microprocessor with instructions written in software for controlling the flow measuring device and displaying information such as flow rate, delivered volume, and back pressure.

Figure 2:
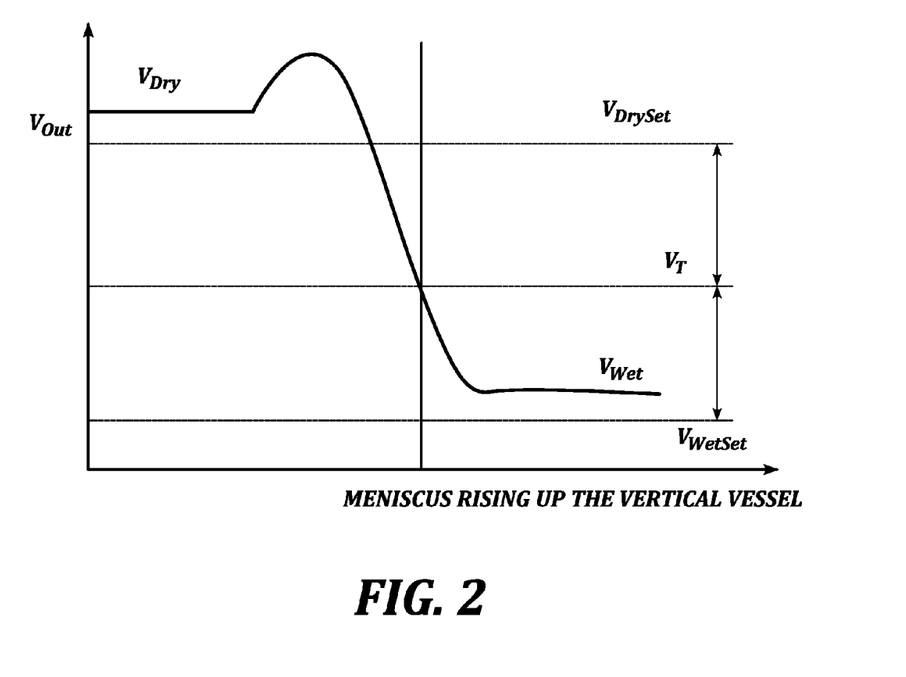
FIG. 2 illustrates how the optical sensor pair produces an output voltage $V_{out}$ that is significantly different when liquid is present in the vessel of the flow measuring device and also illustrates five variables that are used when compensating for temperature-induced changes in the performance of the optical sensor pair.

FIG. 2 illustrates how the optical sensor pair produces an output voltage $V_{out}$ that is significantly different when liquid 16 is present in the vessel 14 of the flow measuring device and also illustrates five variables that are considered when determining whether the vessel 14 is wet or dry. Infrared transmission is higher when water is present in the vessel 14, and in the circuit configuration shown in FIG. 1, the voltage $V_{out}$ rises in the presence of air between the LED 10 and photodetector 12.

As can be seen from FIG. 2, as the meniscus 18 travels up the vessel 14, $V_{Out}$ produces a "hump." As the meniscus 18 moves up the vessel 14 with only air between the LED 10 and photodetector 12 sensor pair, $V_{out}$ is high (less light transmission). As the meniscus 18 reaches the sensor pair it casts a shadow which causes $V_{out}$ to go even higher. When liquid is positioned between the LED 10 and photodetector 12 sensor pair, the light increases rapidly as the infrared travels through only liquid, and $V_{out}$ rapidly drops off, as shown in FIG. 2.

FIG. 2 also shows the relationship between the output voltage of the sensor pair $V_{out}$ and five system variables that are used in the determination of whether there is liquid in the vessel 14, i.e., it is wet, or whether there is air present in the vessel 14, i.e., it is dry. These include:

$V_{Dry}$ which is the measured voltage when there is air present in the vessel 14;

$V_{wet}$ which is the measured voltage when there is liquid present in the vessel 14;

$V_{WetSet}$ which is the voltage level that is set initially with liquid present by adjustment manually or automatically of resistors $R_1$ and $R_2$ in FIG. 1;

$V_{DrySet}$ is the voltage that is observed when the vessel 14 was dry during initial setup; and a threshold voltage $V_T$ between both $V_{WetSet}$ and $V_{DrySet}$.

In operation, the processing unit determines the vessel 14 to be wet if $V_{Out} \leq V_T$. The threshold voltage $V_T$ is determined during an initial setup of the device as:

$$V_T = V_{WetSet} + K(V_{DrySet} - V_{Wetset}) \quad \text{(Eq.1)}$$

where $V_T$ can be halfway between $V_{WetSet}$ and $V_{DrySet}$ (K=0.5 or another value).

A problem, however, arises using this method due to $V_{Wet}$ and $V_{Dry}$ changing with the temperature of the sensor pair, which can lead to faulty determination of wet and dry values if either $V_{Dry}$ or $V_{Wet}$ reaches the threshold $V_T$. This is shown schematically in FIG. 3 which shows how the voltage obtained from the optical sensor pair varies as a function of temperature when liquid is present $V_{Wet}$ and not present $V_{Dry}$, in the vessel 14 of the flow measuring device.

The present disclosure details a method of compensating for the effects of varying temperature of the sensor pair by minimizing the prospect of either $V_{Dry}$ or $V_{Wet}$ reaching the threshold voltage $V_T$. This is achieved without knowing the actual temperature of the sensor pair. Instead, a corrected figure for $V_{Out}$ can be calculated by knowing the current value of $V_{Wet}$, and subtracting from the original $V_{WetSet}$. $V_{Wet}$ is available whenever the tube is known to be full of liquid. So:

$$V_{Wetshift} = V_{Wet} - V_{WetSet} \quad \text{(Eq.2)}$$

A correction is then applied to $V_{Out}$ to give $V_{OutCorrected}$, as follows:

$$V_{OutCorrected} = V_{Out} - V_{Wetshift} \quad \text{(Eq.3)}$$

Figure 4:
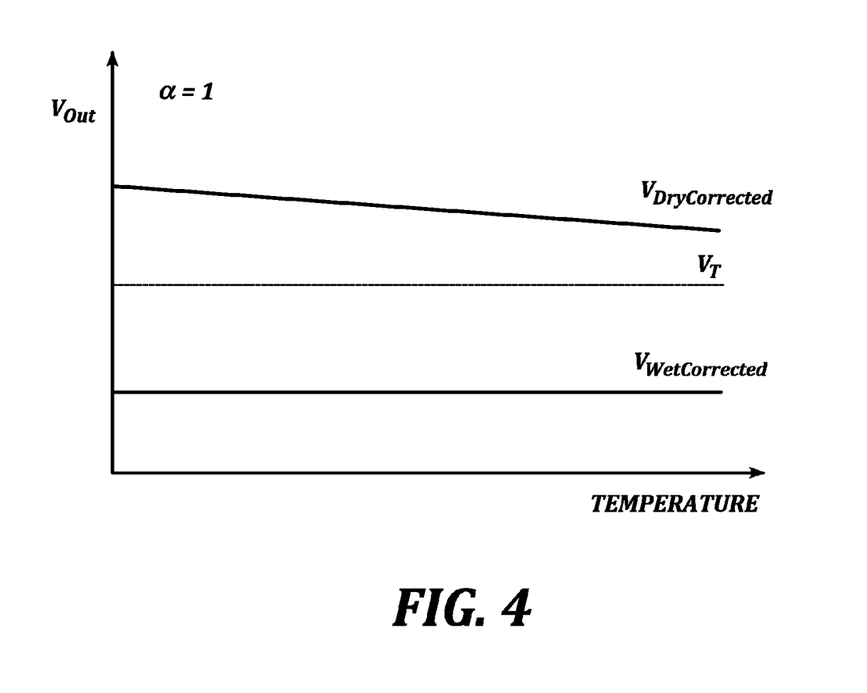
FIGS. 4 and 5 are respectively graphs illustrating how the present disclosure compensates for the effects of varying temperature on the sensor pair by minimizing the prospect of either of the compensated signals $V_{DryCorrected}$ or $V_{WetCorrected}$ reaching the threshold voltage $V_T$ which could give a potentially false determination that liquid is present, or not, in the vessel of the flow measuring device.

This results in a temperature compensation response, as shown schematically in FIG. 4.

Figure 3:
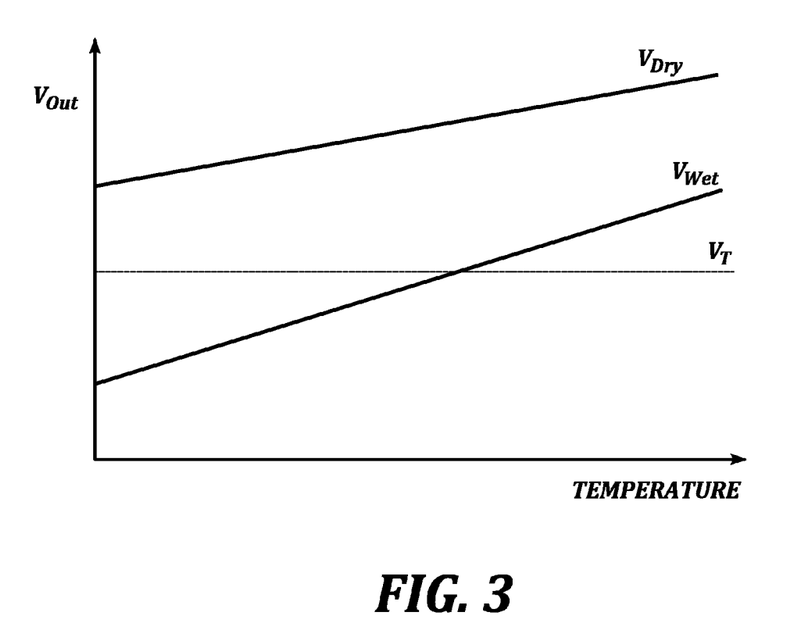
FIG. 3 is a graph illustrating how the voltage obtained from the optical sensor pair varies as a function of temperature when liquid is present $V_{Wet}$, and not present $V_{Dry}$, in the vessel of the flow measuring device.
Figure 5:
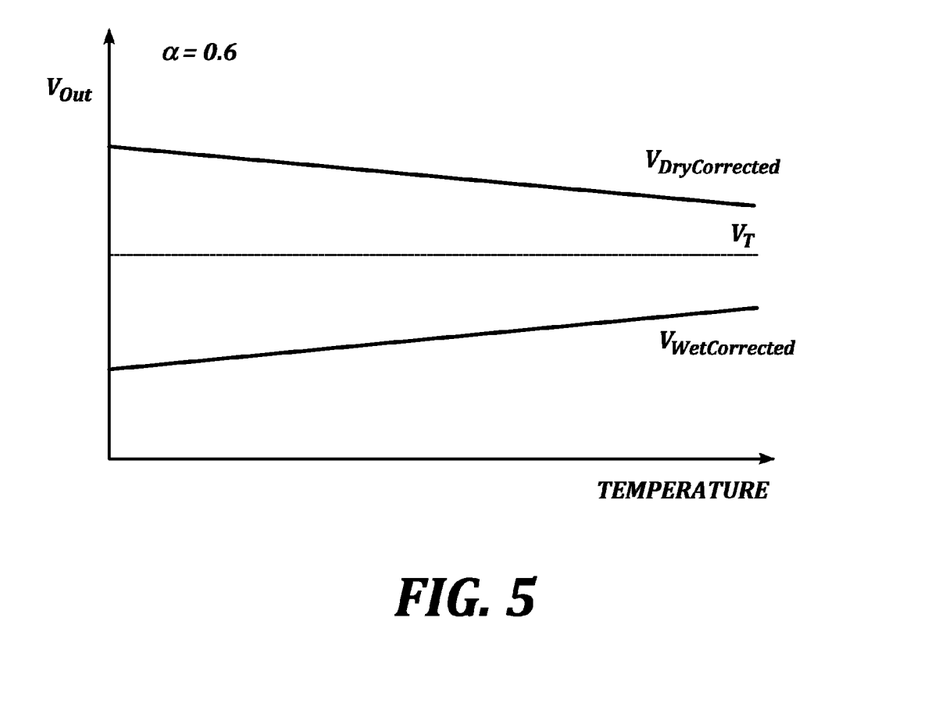

With many proprietary optical sensor pairs available in the marketplace, the dry value rises less with increases in temperature, and therefore may be overcorrected by this method. A factor α can be introduced to cause the $V_{OutCorrected}$ values for wet and dry conditions to remain approximately equidistant from $V_T$, as shown in FIG. 5.

$$V_{OutCorrected} = V_{Out} - \left(\frac{1-\alpha}{2}\right)V_{Wetshift} \quad \text{(Eq. 4)}$$

where α is the ratio of the change in the $V_{Dry}$ to the change in $V_{Wet}$ with temperature, i.e., the ratio of the gradients of $V_{Dry}$ and $V_{Wet}$ in FIG. 3. The factor α is determined by experiment and depends on the particular proprietary optical sensor pair used. Typically, α is found to be around 0.6. As can be seen from Eq.4 and FIGS. 4 and 5, the addition of the factor α modifies the $V_{OutCorrected}$ for both wet ($V_{WetCorrected}$) and dry ($V_{DryCorrected}$) conditions, respectively, around $V_T$.

It is the obtained value of $V_{OutCorrected}$ that is used to determine if the vessel 14 is wet if $V_{OutCorrected} \leq V_T$.

Figure 6:
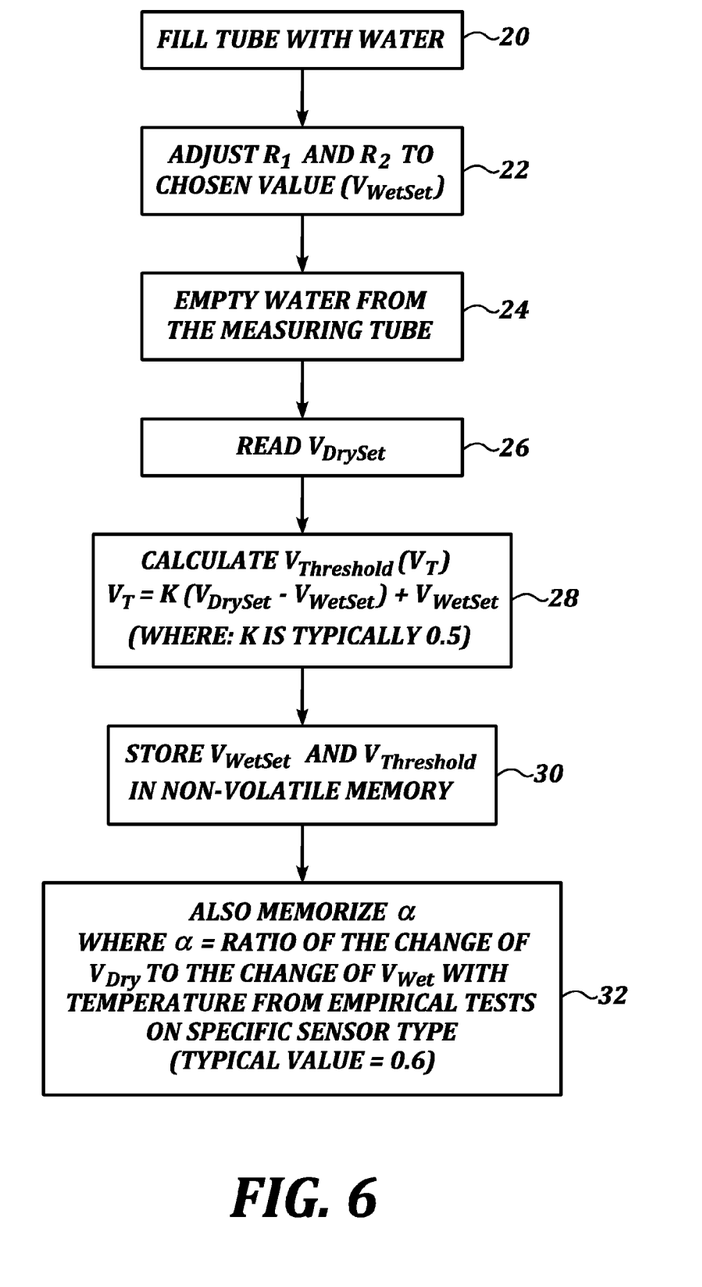
FIG. 6 illustrates calibration steps that are taken during initial factory setup of the flow measuring device to obtain the parameters $V_{WetSet}$, $V_{DrySet}$ and $V_T$. $V_{WetSet}$ and $V_T$ are then stored in the memory of the device.

FIG. 6 illustrates calibration steps that are taken during initial factory setup of the flow measuring device to obtain the parameters $V_{WetSet}$, $V_{DrySet}$ and $V_T$ that are subsequently stored in the memory of the flow measuring device.

As shown in FIG. 6, during factory setup, the vessel 14 is initially filled with liquid 20. At step 22, the resistors $R_1$ and $R_2$ are adjusted, manually or automatically, to obtain $V_{WetSet}$. This voltage is chosen to maximize the difference between $V_{Wet}$ and $V_{Dry}$. $V_{WetSet}$ is typically 20% of the maximum possible $V_{out}$. $V_{WetSet}$ is the voltage that is set initially with liquid present in the vessel 14. At step 24, the liquid is emptied from the measuring vessel 14 and a measurement of $V_{DrySet}$ performed 26.

As the determination of $V_{WetSet}$ and $V_{DrySet}$ has been made, the processing unit then calculates at step 28 the threshold voltage $V_T$ using Eq. 1. Typically, the constant K is 0.5. At step 30, $V_{WetSet}$ and $V_T$ are stored in a non-volatile memory of the processing unit.

The factor α is then obtained and stored 32 in the non-volatile memory of the processing unit. The factor α is the ratio of the change of $V_{Dry}$ to the change of $V_{Wet}$ with temperature, i.e., the ratio of the gradients of $V_{Dry}$ and $V_{Wet}$ in FIG. 3. The factor α is determined by experiment and depends on the particular proprietary optical sensor pair used. Typically, α is found to be around 0.6.

Figure 7:
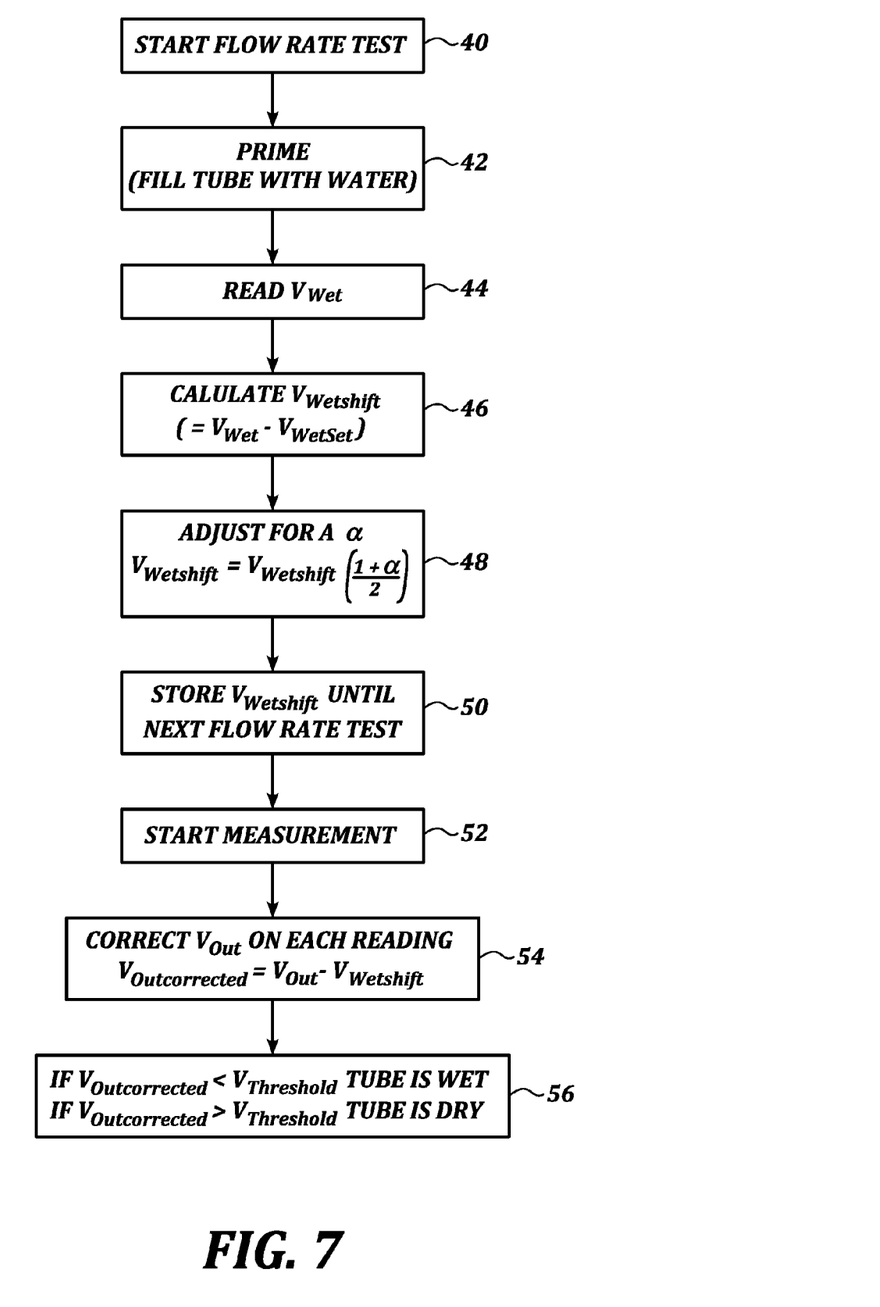
FIG. 7 illustrates a method of operating the flow measuring device according to the present disclosure which compensates for the effects of temperature on the optical sensors.

FIG. 7 shows how the flow measuring device of the present disclosure is used in operation and compensates for the effects of varying temperature of the sensor pair by determining the corrected output $V_{OutCorrected}$.

At step 40, a flow rate test is initiated and the vessel 14 is then filled with liquid 42. The voltage $V_{Wet}$ is then measured 44 when there is liquid present in the vessel 14. A calculation of $V_{WetShift}$ can then be performed 46 using Eq. 2. At step 48, the calculated $V_{WetShift}$ is compensated by factor α using Eq. 4 to shift the responses to remain approximately equidistant from $V_T$. $V_{WetShift}$ is then stored in the non-volatile memory at step 50.

Using such an approach, a flow measuring device including such a compensation algorithm is able to compensate for temperature-induced changes in the performance of the optical sensors and accurately check that the medical infusion device under test is delivering medication at the required dose. In this way, with each subsequent measurement performed at step 52, the output voltage of the sensor pair $V_{Out}$ is corrected 54 to give $V_{OutCorrected}$ using Eq. 3.

It is the obtained value of $V_{OutCorrected}$ that is used to determine at step 56 if the vessel 14 is wet, i.e., if $V_{OutCorrected} \leq V_T$. As the time taken for the liquid meniscus to traverse two or more levels with a known volume between is measured, it is possible to accurately measure the flow rate.

Various alterations and modifications may be made to the present disclosure will without departing from the scope of the invention.

The embodiments of the invention in which an exclusive property or privilege is claimed are defined as follows:

1. A flow measuring device, comprising:
    a container for receiving a flow of liquid;
    a plurality of optical sensors associated with the container, each of the plurality of optical sensors producing an output signal dependent upon the presence of liquid reaching a level in the container associated with each optical sensor;
    a digital signal processor that is configured to execute instructions from a memory that cause the digital signal processor to:
        modify the output signal in accordance with at least one predetermined temperature compensation factor; and
        calculate a flow rate from the time at which the liquid traverses between two levels in the container,
    wherein the at least one predetermined temperature compensation factor compensates for the effects of temperature on the plurality of optical sensors by minimizing the prospect of the output signal exceeding a predetermined threshold voltage that produces a potentially false determination that liquid is present in the container.

2. The flow measuring device as claimed in claim 1, further comprising means for displaying the calculated flow rate.

3. The flow measuring device as claimed in claim 2, wherein the means for displaying are implemented in the digital signal processor.

4. The flow measuring device as claimed in claim 3, wherein the microprocessor or digital signal processor also includes additional programmable functionality comprising the capability to determine and display the delivered liquid volume, flow rate, and/or back pressure.

5. The flow measuring device as claimed in claim 1, wherein the at least one predetermined temperature compensation factor compensates for the effects of temperature on the plurality of optical sensors.

6. The flow measuring device as claimed in claim 1, wherein the at least one predetermined temperature compensation factor compensates for the effects of temperature on the plurality of optical sensors by minimizing the prospect of the output signal falling below the predetermined threshold voltage which produces a potentially false determination that liquid is not present in the container.

7. The flow measuring device as claimed in claim 1, wherein the plurality of optical sensors are each configured as a light-emitting diode and corresponding photodetector positioned on opposing sides of the container.

8. The flow measuring device as claimed in claim 1, wherein the plurality of optical sensors are positioned to define at least two levels in the container having at least one known volume therebetween.

9. A method for controlling a flow measuring device, the flow measuring device comprising a container for receiving a flow of liquid and a plurality of optical sensors associated with the container and positioned to define at least two levels in the container, the method comprising:
    sensing at least one output signal from each of the plurality of optical sensors (VOut) that is dependent upon the presence of liquid reaching a level in the container associated with each optical sensor;
    providing a digital signal processor that is configured to execute instructions from a memory;
    modifying, using the digital signal processor, the sensed output signal in accordance with at least one predetermined temperature compensation factor; and
    calculating, using the digital signal processor, a flow rate from the time at which the liquid traverses between two levels in the container;
    wherein the at least one predetermined temperature compensation factor compensates for the effects of temperature on the plurality of optical sensors by minimizing the prospect of the output signal exceeding a predetermined threshold voltage that produces a potentially false determination that liquid is present in the container.

10. The method as claimed in claim 9, wherein modifying the sensed output signal in accordance with at least one predetermined temperature compensation factor further comprises:
    priming the container with liquid and modifying the sensed output signal from each of the plurality of optical sensors to a first voltage output level (VWetSet);
    removing liquid from the container and sensing a second voltage output level (VDrySet) from each of the plurality of optical sensors; and
    calculating a threshold voltage (VT) from the first voltage output level (VWetSet) and the second voltage output level (VDrySet).

11. The method as claimed in claim 10, wherein calculating a threshold voltage (VT) from the first voltage output level (VWetSet) and the second voltage output level (VDrySet) is obtained from VT=VWetSet+K(VDry Set−VWetSet), where K=0.5 or another value.

12. The method as claimed in claim 11, further comprising:
    priming the container with liquid and sensing a third voltage output level (VWet) from each of the plurality of optical sensors;
    removing liquid from the container and sensing a fourth voltage output level (VDry) from each at the plurality of optical sensors;
    repeating the priming and removing steps over a range of temperatures; and
    calculating a compensation factor a that is a ratio of the change of VDry to the change of VWet with temperature.

13. The method as claimed in claim 12, further comprising:
    storing the first voltage output level (VWetSet), the second voltage output level (VDrySet), the threshold voltage (VT), and the compensation factor α in a non-volatile memory.

14. The method as claimed in claim 13, further comprising:
    calculating a fifth voltage output level (VWetShift) from VWetShift=VWet−VWetSet; and
    compensating the fifth voltage output level (VWetShift) by the compensation factor α stored in the non-volatile memory.

15. The method as claimed in claim 14, further comprising:

calculating a temperature compensated signal (VOutCorrected) from VOutCorrected=VOut−VWetShift.

16. The method as claimed in claim 9, further comprising:

displaying the calculated flow rate.

17. A flow measuring system, comprising:

a digital signal processor that is configured to execute instructions from a non-transitory computer readable medium;

a computer program product having computer-executable instructions stored in a non-transitory computer readable medium for controlling a flow measuring device, the flow measuring device comprising a container for receiving a flow of liquid and a plurality of optical sensors associated with the container and positioned to define at least two levels in the container, the computer program product comprising:

computer-executable instructions for sensing at least one output signal from each of the plurality of optical sensors (VOut) that is dependent upon the presence of liquid reaching a level in the container associated with each optical sensor;

computer-executable instructions for modifying the sensed output signal in accordance with at least one predetermined temperature compensation factor; and computer-executable instructions for calculating a flow rate from the time at which the liquid traverses between two levels in the container, wherein the at least one predetermined temperature compensation factor compensates for the effects of temperature on the plurality of optical sensors by minimizing the prospect of the output signal exceeding a predetermined threshold voltage that produces a potentially false determination that liquid is present in the container.

* * * * *

UNITED STATES PATENT AND TRADEMARK OFFICE
CERTIFICATE OF CORRECTION

PATENT NO. : 9,927,273 B2
APPLICATION NO. : 14/549860
DATED : March 27, 2018
INVENTOR(S) : Malcolm Charles Brown et al.

It is certified that error appears in the above-identified patent and that said Letters Patent is hereby corrected as shown below:

In the Claims

Column 8, Claim 12, Line 52:
"compensation factor a" should read, -- compensation factor α --.

Signed and Sealed this
Twenty-fourth Day of December, 2019

Andrei Iancu
*Director of the United States Patent and Trademark Office*